United States Patent Office 3,312,864
Patented Apr. 4, 1967

3,312,864
PROTECTIVE RELAYING DEVICES
Paul J. Schwanenflugel, Belleville, N.J., assignor to Westinghouse Electric Corporation, Pittsburgh, Pa., a corporation of Pennsylvania
Filed Aug. 23, 1963, Ser. No. 304,099
7 Claims. (Cl. 317—23)

This invention relates to protective relaying devices and it has particular relation to network protectors for polyphase electrical systems.

The control equipment employed for controlling the circuit breaker in a network protector desirably may be to a substantial extent of static construction. When employing static components it is particularly helpful to construct the network protector control equipment on a single-phase basis. This is accomplished by converting a substantial amount of the control information from a polyphase basis into a single-phase basis by the application of the principles of symmetrical components. This eliminates the need for control equipment for each phase of a polyphase system and it also eliminates the need for polyphase elements in the control equipment. An example of the application of the principles of symmetrical components to network protectors is found in the Powers et al. Patent 2,042,187, and in the copending application of J. C. Gambale, Serial No. 247,611, filed December 27, 1962, now U.S. Patent No. 3,248,609 and dated April 26, 1966, entitled, Protective Relaying Devices, and assigned to the same assignee.

Under the principles of symmetrical components, a polyphase quantity such as voltage or current may be represented by a number of symmetrical components. These symmetrical components are known as a positive-sequence symmetrical component here referred to as a positive-sequence or a positive symmetrical component; a negative-sequence symmetrical component here referred to as a negative-sequence or a negative symmetrical component and a zero-sequence symmetrical component here referred to as a zero-sequence or a zero symmetrical component.

In accordance with the invention, closing of the circuit breaker is dependent on proper relations between a phasing voltage across a pole of the circuit breaker and a voltage appearing on the load side of the circuit breaker. These relations are detected by a circuit which is substantially immune to temperature variations. A balanced circuit is preferred for such detection. In a preferred embodiment of the invention closing of the circuit breaker is restrained by the presence of the negative symmetrical component of voltage on either the feeder side or the load side of a circuit breaker.

The invention also contemplates suitable devices for adjusting the phase angle characteristics of the closing-control voltage and for adjusting the valve of the phasing voltages required for closure of the circuit breaker.

It is therefore an object of the invention to provide an improved protective relaying device.

It is also an object of the invention to provide an improved network protector employing static components.

It is a further object of the invention to provide an improved control for precluding closure of a network circuit breaker under improper load circuit or supply circuit conditions.

It is an additional object of the invention to provide an improved network protector for a polyphase system which employs static components and which has a circuit-breaker-closing control substantially independent of temperature.

It is another object of the invention to provide an improved network protector employing static components and having adjusting mechanism for adjusting circuit-breaker-closing characteristics.

Other objects of the invention will be apparent from the following description taken in conjunction with the accompanying drawings, in which.

Figure 1:
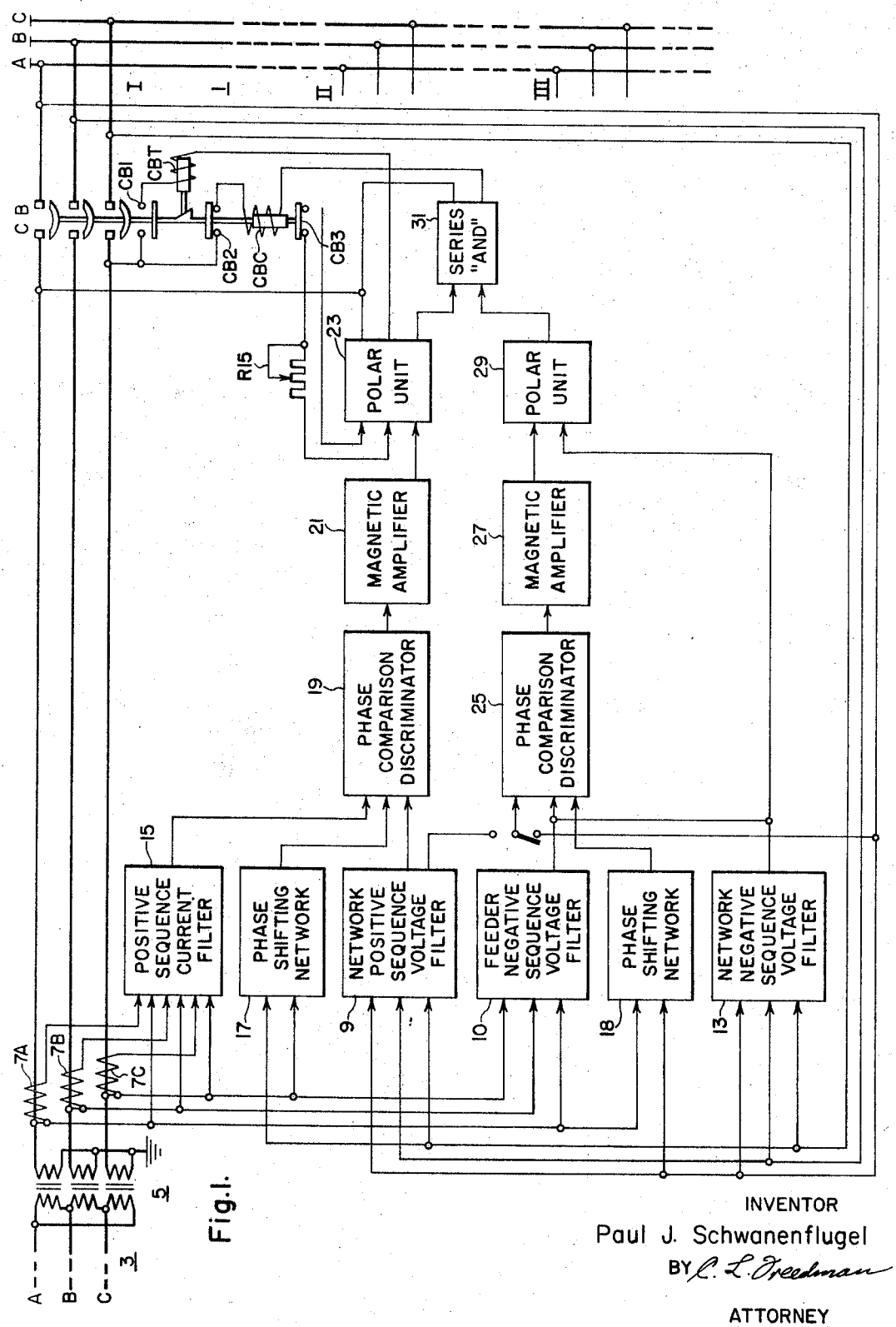
FIGURE 1 is a schematic view with parts shown in block diagram of a network protector embodying the invention.

Referring to the drawings, FIG. 1 shows a secondary network 1 having phase conductors A, B and C. The secondary network may be in any conventional form such as a loop, a grid or a spot network. Each of a plurality of spaced stations I, II and III is to be connected to a separate supply or feeder circuit through a network protector. Inasmuch as the stations are connected to their respective feeder circuits through similar network protectors it will suffice to illustrate and describe the connection of the station I to an associated feeder circuit 3. It will be noted that the feeder circuit 3 is connected to the network 1 through a network transformer 5 and a circuit breaker CB. Primary windings of the transformer 5 are illustrated as connected in delta for energization from the feeder circuit 3. Secondary windings of the transformer 5 are connected in Y or star with a grounded neutral.

The circuit breaker CB is of conventional construction and includes a trip coil CBT, a close coil CBC and two auxiliary switches CB1 and CB2. The auxiliary switch CB1 is closed when the circuit breaker is closed and is open when the circuit breaker is open. The auxiliary switch CB2 is open when the circuit breaker is closed and is closed when the circuit breaker is open.

Currents dependent on the currents flowing in the phase conductors are derived through current transformers 7A, 7B and 7C which are associated respectively with the phase conductors A, B and C between the supply terminals of the circuit breaker and the transformer 5.

Logic components are employed for performing the logic required to control the circuit breaker CB. These logic components are supplied with information in the form of single-phase voltages representing certain symmetrical components. For example, a network positive-sequence voltage filter 9 derives an input from the polyphase voltages present at the load terminals of the circuit breaker CB. This filter has a single-phase output proportional to the positive symmetrical component of the polyphase voltage present at the load terminals and in phase with the phase A line-to-neutral voltage of such polyphase voltage.

A feeder negative-sequence voltage filter 10 is energized in accordance with the polyphase voltage present at the supply terminals of the circuit breaker CB. This filter produces a single-phase voltage output which is proportional to the negative symmetrical component of the polyphase input voltage.

A network negative-sequence voltage filter 13 is energized in accordance with the polyphase voltage present at the load terminals of the circuit breaker CB. This filter produces a single-phase voltage output which is proportional to the negative symmetrical component of the polyphase load voltage.

Information also is desired concerning currents flowing through the circuit breaker. This information is supplied by a positive-sequence current filter 15 which derives inputs from the three current transformers 7A, 7B and 7C. The output of the filter 15 is a single-phase voltage proportional to the positive symmetrical component of the polyphase currents flowing through the circuit breaker and referred to as the positive sequence or the positive symmetrical component.

Finally phase-shifting networks 17 and 18 are provided for deriving single-phase voltages, each of which is proportional to the voltages across one pole of the circuit breaker CB but which is phase shifted with respect to the voltage across the selected pole of the circuit breaker. For present purposes, it will be assumed that the voltages across the poles corresponding to the C and A phases of the polyphase system are employed respectively for the networks 17 and 18.

The logic for effecting certain controls of the circuit breaker CB now will be considered. If the circuit breaker CB is closed the tripping of the circuit breaker is dependent on the outputs of the filters 9 and 15. The outputs of the filters 9 and 15 are supplied to a device 19 which has an output indicating the direction of power flow through the circuit breaker CB. In a preferred embodiment of the invention, the device 19 takes the form of a phase comparison discriminator having a direct voltage output indicating by its polarity the direction of power flow through the circuit breaker CB. If the flow of power is from the feeder circuit 3 to the network 1 the polarity of the output of the discriminator 19 falls in a non-tripping category and the circuit breaker CB remains closed. If the direction of power flow is from the network 1 towards the feeder circuit 3 the polarity of the output of the discriminator 1 is suitable for tripping the circuit breaker CB. Preferably, the sensitivity of the equipment is such that the flow of power from the network 1 to the transformer 5 in an amount equal to the exciting current of the transformer suffices to trip the circuit breaker CB. This assures tripping of the circuit breaker CB when the feeder circuit 3 is deenergized.

If the output of the discriminator 19 is sufficient, it may be applied directly to the circuit breaker CB for the purpose of tripping the circuit breaker. However, in a preferred embodiment of the invention, the output of the discriminator 19 is supplied to a suitable amplifier 21 which desirably may be a magnetic or saturable reactor amplifier. Although the output of the magnetic amplifier 21 may be employed directly for tripping the circuit breaker CB, preferably it is supplied to a suitable static or non-static relay 23 which, in turn, controls the tripping of the circuit breaker. Desirably, the relay 23 may take the form of a polar unit or relay.

If the circuit breaker CB is in tripped condition the reclosure of the circuit breaker is controlled in part by the voltage output of the network 18 and by either the phase A-to-ground load voltage or the output of the filter 9 as selected by a switch SW1. For present purposes it is assumed that the switch selects the A-to-ground load voltage. These voltages are compared by a device 25 having an output which indicates when the voltage relations are such that power will be supplied from the feeder circuit 3 to the network 1. In a preferred embodiment of the invention, the device 25 takes the form of a phase-comparsion discriminator having a direct voltage output which may be employed directly for energizing the closing coil CBC for the purpose of closing the circuit breaker. However, in a preferred embodiment of the invention, the output of the discriminator 25 is supplied to a suitable amplifier 27 which desirably may be a magnetic amplifier.

Although the output of the amplifier may be applied directly to the closing coil CBC, preferably the output is applied to a suitable static or non-static relay 29 which conveniently may be a polar unit or relay. The relay 29 controls the energization of the closing coil CBC through an AND circuit 31.

When work is performed on the electrical system, it is possible that two phases of the network 1 or of the feeder circuit 3 may be interchanged. In order to prevent closure of the circuit breaker CB under these circumstances the output of the filters 10 and 13 are employed for preventing or restraining closure of the circuit breaker. Conveniently, this restraint may be introduced by suitably biasing the polar unit 29.

Under certain conditions the voltages across the circuit breaker CB can produce a pumping action of the circuit breaker. When these circumstances are present, closure of the circuit breaker CB preferably is prevented. In a preferred embodiment of the invention the presence of the circumstances is determined by a comparison of the outputs of the filter 9 and the phase-shifting network 17 by the phase-comparison discriminator 19. The discriminator 19 supplies an input to the AND circuit 31 through the amplifier 21 and the polar relay 23. Thus, the closure of the circuit breaker CB requires a predetermined relationship between the phase A-to-ground load voltage and the voltage output of the network 18 and a predetermined relationship between the output of the filter 9 and the output of the phase-shifting network 17.

Figure 2:
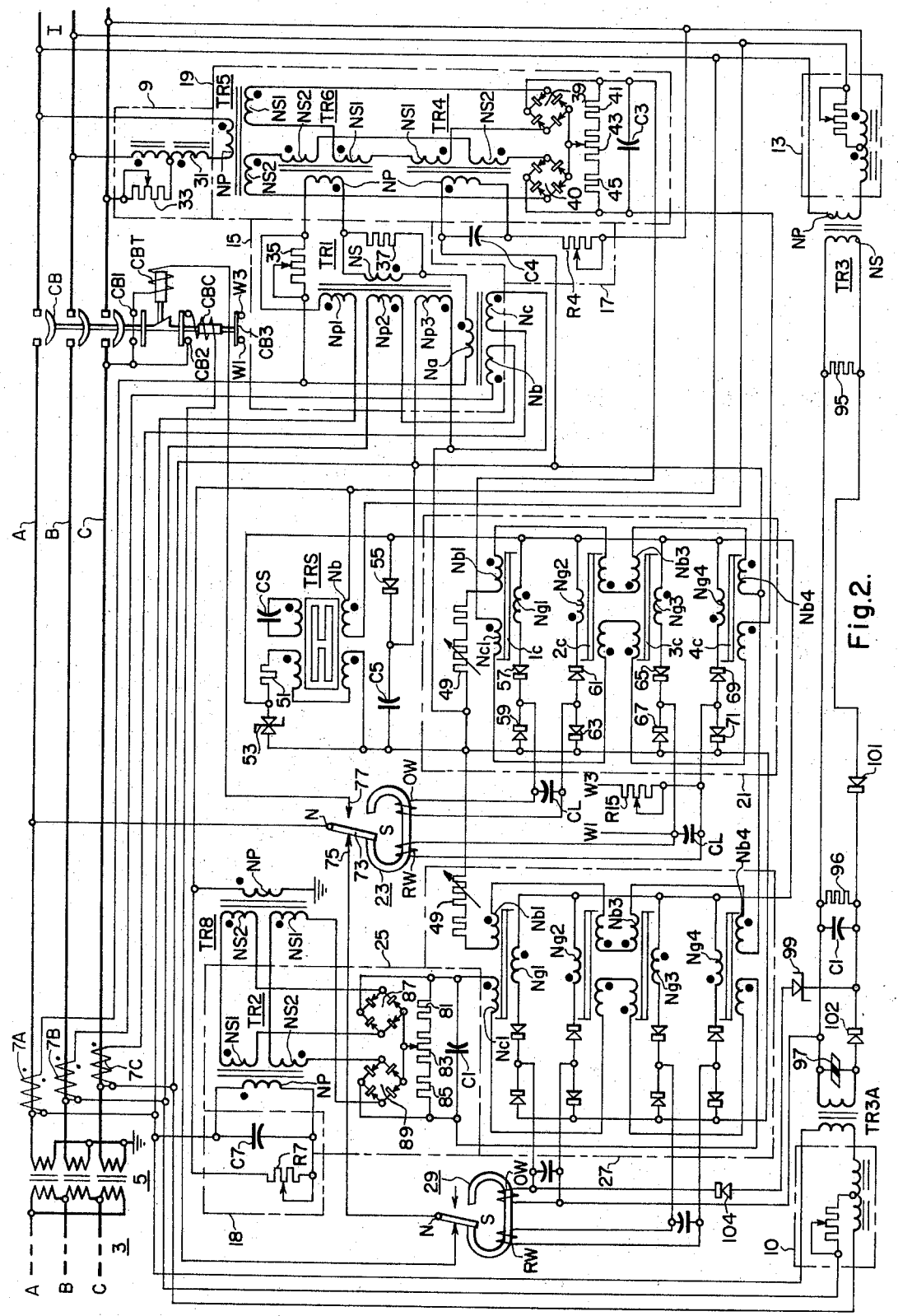
FIG. 2 is a schematic view showing circuits suitable for the network protector of FIG. 1.

FIG. 2 shows preferred circuits for the system of FIG. 1. As shown in FIG. 2, the filter 9 is connected to deliver to the primary winding NP of a transformer TR5 a single-phase voltage corresponding to the positive symmetrical component of the polyphase voltage present at the load terminals of the circuit breaker CB. Consequently, the voltages appearing across the secondary windings NS1 and NS2 of the transformer TR5 correspond to such positive symmetrical component.

Preferably, the positive-sequence filter includes a tapped mutual reactor 31 and a resistor 33. The primary part of the tapped reactor and the resistor 33 are connected in series across the load terminals of the circuit breaker for the phases B and C. The entire reactor and the primary winding NP of the transformer TR5 are connected in series across the load terminals of the circuit breaker for phases A and B. Conventional polarity markings are shown for the various transformers and reactors in FIG. 2. By properly proportioning tthe reactor 31 and the resistor 33 in acccrdance with the teachings of the Sonnemann Patent 2,470,661 issued May 17, 1949, a single-phase voltage is applied across the primary winding NP of the transformer TR5 which corresponds to the positive symmetrical component of the polyphase voltage at the load terminals of the circuit breaker.

The filters 10 and 13 are similar in construction to the filter 9. However, in the cases of the filters 10 and 13, the connections of the primary windings of the reactors to the feeder and load terminals respectively of the circuit breaker for the phases C and B are interchanged. As a result of this interchange the filters 10 and 13 apply across the primary windings NP of transformers TR3 and TR3A single-phase voltages which correspond to the negative symmetrical components of the polyphase voltages respectively at the supply and load terminals of the circuit breaker.

The filter 15 is designed to develop across the primary winding NP of a transformer TR6 a voltage corresponding to the positive symmetrical component of polyphase current flowing through the circuit breaker. Corresponding voltages consequently are developed across the two secondary windings NS1 and NS2 of this transformer.

The filter 15 includes a three winding reactor having three windings $Na$, $Nb$ and $Nc$ all wound on a common magnetic core. The windings $Nb$ and $Nc$ are energized in accordance with line currents flowing in phases B and C of the circuit breaker. The winding $Na$ of the mutual reactor is connected in series with resistors 35 and 37 across the primary winding NP of the transformer TR6. A current proportional to the line current flowing through phase A of the circuit breaker is directed through the resistor 35. If the resistor 35 has a resistance value equal to R, the mutual reactance between windings of the mutual reactor is selected to be equal to R. With these proportions a current proportional to $I_{a1}+I_{a0}$ (wherein $I_{a1}$ represents a positive symmetrical component of current and $I_{a0}$ represents the zero symmetrical component of current) flows through the resistor 35.

In order to remove the zero symmetrical component of current from the output of the filter a voltage is produced across the resistor 37 which is equal and opposite to the voltage produced across the resistor 35 by such zero symmetrical component. To this end a transformer TR1 has three primary windings $Np1$, $Np2$ and $Np3$ which are energized respectively in accordance with the line currents flowing in the line conductors of phases A, B and C respectively. If the secondary winding NS of the transformer TR1 has three times as many turns as each of the primary windings of the transformer and if the resistors 35 and 37 are equal in effective resistance value, a voltage is applied to the primary winding NP of the transformer TR6 which is dependent solely on the positive symmetrical component of the polyphase currents flowing through the circuit breaker. The ratio of the current transformer TR1 may be modified by varying the ratio of the resistors 35 and 37. Thus, if the resistor 37 has an effective resistance value twice that of the resistor 35 a transformer ratio of 1/6 is employed instead of the ratio 1/3 previously discussed. This may facilitate the adoption of a smaller current transformer.

The phase-shifting network 17 includes a capacitor C4 and a resistor R4 which are connected in series across the pole of the circuit breaker which corresponds to the C phase. Conveniently, the resistor R4 may be adjustable for the purpose of facilitating adjustment of the phase shifter. It will be noted that the voltage across the capacitor C4 is applied across the primary winding of a transformer TR4 which has two secondary windings NS1 and NS2.

Similarly, the phase-shifting network 18 includes a capacitor C7 and an adjustable resistor R7 connected in series across the pole of the circuit breaker which corresponds to the A phase. The voltage across the capacitor C7 is applied across the primary winding NP of a transformer TR2 which has two secondary windings NS1 and NS2.

When the circuit breaker CB is closed, a voltage is developed across the filter capacitor C3 which is dependent on the direction of power flow through the circuit breaker. A preferred circuit for deriving such a voltage now will be described.

The secondary winding NS1 of the transformer TR5, the secondary winding NS1 of the transformer TR6 and the secondary winding NS1 of the transformer TR4 are connected in series across the input terminals of a full-wave rectifier 39. The secondary winding NS2 of the transformer TR5, the secondary winding NS2 of the transformer TR6 and the secondary winding NS2 of the transformer TR4 are connected in series across the input terminals of a full-wave rectifier 40. It will be noted that a tapped resistor 43 is located intermediate two resistors 41 and 45 which are equal in resistance value and the three resistors are connected in series across the capacitor C3. The output voltage of the full-wave rectifier 39 is connected between the tap on the resistor 43 and the right-hand terminal of the resistor 41. The output of the full wave rectifier 40 is applied between the tap of the resistor 43 and the left-hand terminal of the resistor 45. The voltage outputs of the two rectifiers are connected in opposition across the resistors 41, 43 and 45. Consequently, the voltage across the capacitor C3 is dependent on the difference between the output voltages of the two rectifiers.

When the circuit breaker CB is closed no voltage is applied across the phase shifting network 17. Consequently the secondary windings of the transformer TR4 are not effective for introducing voltages in the input circuits of the rectifiers. If the vector of the voltage across each of the secondary windings of the transformer TR5 is designated by the reference character E1 and the vector of the voltage across each of the secondary windings of the transformer TR6 is designated by the reference character E2 then it follows that the resultant voltage appearing across the capacitor C3 is dependent on the difference between two rectified quantities derived from $(E1+E2)$ and $(E1-E2)$. This resultant voltage has a polarity dependent on the direction of power flow through the circuit breaker. It will be assumed that when the direction of power flow is from the network 1 to the feeder circuit 3 a plus voltage appears across the capacitor C3. This plus voltage is utilized to trip the circuit breaker CB.

The magnetic amplifier 21 may be of conventional construction. In the embodiment illustrated four magnetic cores 1C, 2C, 3C and 4C are provided. These cores preferably are constructed of a square-loop soft magnetic material. Each of the cores is provided with three windings identified as windings $Nb$, $Nc$ and $Ng$ with a subscript corresponding to the number of the specific core with which the windings are associated. It will be noted that the control windings $Nc_1$, $Nc_2$, $Nc_3$ and $Nc_4$ are connected in series across the capacitor C3. The four bias windings $Nb_1$, $Nb_2$, $Nb_3$ and $Nb_4$ are connected in series with each other and with an adjustable resistor 49 across a suitable constant direct voltage. Conveniently the source may take the form of a conventional regulating transformer TRS having its primary winding $Nb$ connected across the A and B load terminals of the circuit breaker CB and having a secondary winding connected across a capacitor CS. The output circuit of the regulating transformer is connected across a resistor 51 and a bipolar voltage limiter 53 in series. Consequently, an alternating voltage appears across the limiter 53 which has substantially a contant magnitude over a substantial range of variation of the magnitude of the voltage input to the primary winding of the transformer TRS. A rectifier 55 and a capacitor C5 are connected in series across the limiter 53 to produce a substantially constant direct voltage across the capacitor C5. This voltage is applied to the bias winding circuit of the amplier 21.

A constant alternating voltage such as that appearing across the limiter 53 is employed for the output windings of the amplifier 21. For example, the output winding $Ng_1$ is connected in series through back-to-back rectifiers 57 and 59 across the limiter 53. The output winding $Ng_2$ is connected through back-to-back rectifiers 61 and 63 across the limiter 53. However, it will be noted that the rectifiers 61 and 63 are oppositely poled relative to the rectifiers 57 and 59. The output winding $Ng_3$ is connected through back-to-back rectifiers 65 and 67 across the limiter 53 whereas the output winding $Ng_4$ is connected across the limiter through back-to-back rectifiers 69 and 71. It will be noted that the rectifiers 69 and 71 are oppositely poled relative to the rectifiers 65 and 67.

The differential relay 23 has an operating winding OW and a restraining winding RW. The operating winding OW has one terminal connected between the rectifiers 57 and 59 whereas the opposite terminal of the winding is connected between the rectifiers 61 and 63. The restraining winding RW has one terminal connected between the rectifiers 65 and 67 and a second terminal connected between the rectifiers 69 and 71.

The polarized relay has a permanent magnet armature 73 biased into engagement with a fixed contact 75. When the operating winding OW is adequately energized, the armature 73 is actuated into engagement with a fixed contact 77. In this latter condition, the armature completes an energizing circuit for the tripping coil of the circuit breaker.

With a plus output from the discriminator 19 the operating winding OW is energized to move the armature 73 into tripping condition. For a minus output from the discriminator the restraining winding RW is energized to maintain the armature 73 in engagement with the fixed contact 75.

When the right-hand terminal of the limiter 53 is positive, current flows from this terminal through the output winding $Ng_1$, the rectifier 57, the operating winding OW and the rectifier 63 to the left-hand terminal of the limiter 53. When the left-hand terminal of the limiter is positive, current flows from this terminal through the rectifier 59, the operating winding OW, the rectifier 61 and the output winding $Ng_2$ to the upper terminal of the limiter 53. Therefore, the operating winding OW receives a rectified current having a magnitude dependent on the magnitude of the plus output of the associated discriminator 19. A smoothing capacitor CL is connected across the winding OW.

The restraining winding RW is associated with the output windings $Ng_3$ and $Ng_4$ in a generally similar manner and receives a direct current having a magnitude dependent on the magnitude of the negative output of the associated discriminator 19. Inasmuch as the magnetomotive forces of the operating winding OW and the restraining winding RW act in opposition to each other the differential relay 23 responds to the difference between the energizations of the two windings.

When the circuit breaker CB is open, it should be closed only if a condition of the system is such that the feeder circuit 3 will supply power to the network 1. Closing of the circuit breaker is dependent in part on the relations between the phasing voltage represented by a vector $\dot{E}_p$ appearing across the A pole of the circuit breaker and a reference voltage represented by a vector $\dot{E}_r$ corresponding to the load voltage to ground for phase A. Inasmuch as the latter is in phase with the voltage output of the network positive sequence voltage filter 9 it follows that the output of the filter 9 may supply the desired reference voltage.

For present purposes it will be assumed that the reference voltage $\dot{E}_r$ is derived from two secondary windings NS1 and NS2 of a transformer TR8 having a primary winding NP connected across the phase A-to-ground load voltage. If as above-noted the filter 9 were to be employed as a source of the reference voltage $\dot{E}_r$, these secondary windings would be coupled for energization from the primary winding of the transformer TR5.

The discriminator 25 is energized by a first quantity equal to $\dot{E}_p - \dot{E}_r$ which is rectified and a second quantity equal to $\dot{E}_p + \dot{E}_r$ which is rectified. The difference between these two rectified quantities appears across a capacitor C1 and across three series resistors 81, 83 and 85, the center resistor having an adjustable tap. The output of a full-wave rectifier 87 is applied between the adjustable tap on the resistor 83 and the right-hand terminal of the resistor 81. The output of a full-wave rectifier 89 is applied between the adjustable tap on the resistor 83 and the left-hand terminal of the resistor 85. Consequently, the voltage drops produced by the two rectifiers act in opposition to each other.

The secondary winding NS2 of the transformer TR8 and the secondary winding NS1 of the transformer TR2 are connected in series opposition across the input terminals of the rectifier 87. Consequently, the rectifier 87 is energized in accordance with the quantity $\dot{E}_r - \dot{E}_p$.

The secondary winding NS2 of the transformer TR2 and the secondary winding NS1 of the transformer TR8 are connected in series aiding across the input terminals of the rectifier 89. Consequently this rectifier is energized in accordance with the quantity $\dot{E}_r + \dot{E}_p$.

If the quantity $\dot{E}_r + \dot{E}_p$ is larger than the quantity $\dot{E}_r - \dot{E}_p$ a plus signal appears across the capacitor C1 which indicates that the phasing voltage $E_{\phi 1}$ does not lead or lag $E_{n1}$ by more than 90°. This plus signal would be a closing signal for the circuit breaker CB. This signal is amplified by the magnetic amplifier 27 which is similar to the previously described magnetic amplifier 21. The output of the magnetic amplifier 27 is applied to the differential relay 29 which is similar to the previously described differential relay 23. The relay 29 has its armature biased to the position illustrated in FIG. 2 which corresponds to its circuit-breaker-closing position. The plus signal across the capacitor C1 produces a net force acting on the armature of the differential relay 29 to urge the armature into its illustrated position.

If the quantity $\dot{E}_r + \dot{E}_p$ is less than the quantity $\dot{E}_r - \dot{E}_p$, a reversed or minus signal appears across the capacitor C1. Such a signal indicates that the phasing voltage $E_{\phi 1}$ leads the positive symmetrical component of voltage on the load side of the circuit breaker CB by more than 90° and less than 270°. Such a signal indicates that the circuit breaker should not be closed and acts to urge the armature of the differential relay 29 away from its illustrated or closing position.

Figure 4:
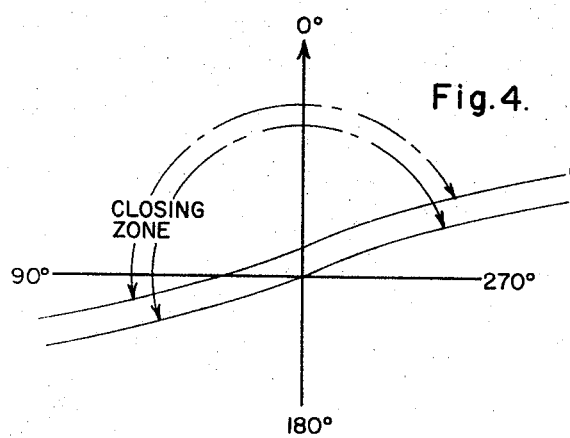

As previously described the differential relay 29 provides a closing control which is effective over a zone of approximately 180°. In most prior art installations of network protectors it is the practice to limit the closing of a network protector to a much smaller zone. A typical closing characteristic is shown in Fig. 11–4 on page 106 of a book entitled, "Silent Sentinels," published in 1949 by the Westinghouse Electric Corporation, Newark, N.J.

When the circuit breaker CB is open a reactance control of the closing of the circuit breaker is exercised by the discriminator 19. Under these circumstances substantially no current flows through the circuit breaker and the transformer TR6 has substantially no effect on the performance of the discriminator. Let it be assumed that each of the secondary windings NS1 and NS2 of the transformer TR4 introduces a phasing voltage $E_{\phi c}$ which corresponds to the voltage across the C phase pole of the circuit breaker shifted by an amount determined by the phase-shifting network 17. Under these circumstances, a resultant voltage $E_{n1} + E_{\phi c}$ is applied across the input terminals of the rectifier 40 whereas a voltage $E_{n1} - E_{\phi c}$ is applied across the input terminals of the rectifier 39. The adjustment of the phase-shifting network 17 may be such that a minus voltage appears across the capacitor C3 when the phasing voltage leads the voltage $E_{n1}$ by an angle lying between zero and 180° as shown by the curve CU3 in FIG. 5. For such minus signals from the discriminator 19 the armature 73 of the differential relay 23 will engage the fixed contact 75 to complete with the differential relay 29 an energizing circuit for the closing coil of the circuit breaker CB. If the system conditions fall outside the closing zone of the curve CU3 as determined by the discriminator 19 a positive signal appears across the capacitor C3 and the armature 73 of the differential relay 23 is actuated away from the fixed contact 75 to prevent closure of the circuit breaker. The two closing controls exercised by the differential relays thus provide a closing zone which is similar to that shown in the aforesaid "Silent Sentinels."

Figure 5:
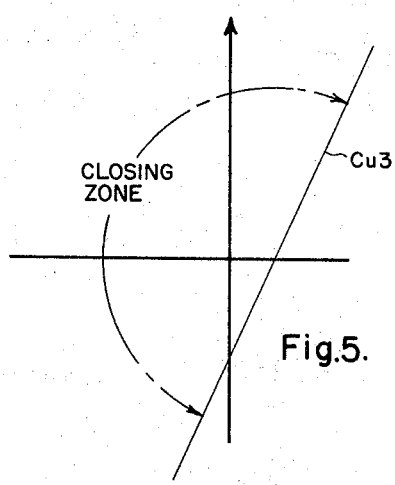
Figure 6:
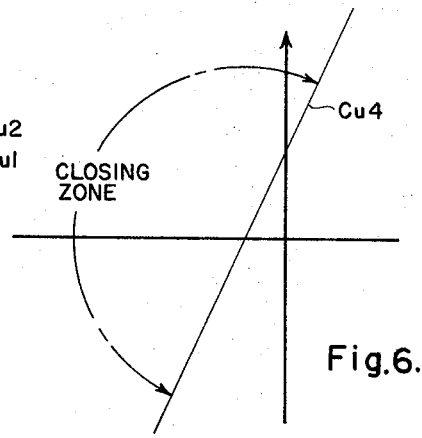

In FIG. 5, the zero output line or curve CU3 passes to the right of the origin. For some electrical systems this may result in a "pumping" operation of the circuit breaker CB wherein the circuit breaker repeatedly closes and opens. Preferably a design is adopted wherein the zero output line passes to the left of the origin as shown by the curve CU4 of FIG. 6. Such a design is obtained conveniently by adjusting the difference in energizing quantities to which the relay 23 responds. Thus in FIG. 2 an adjustment is provided by connecting an adjustable resistor R15 across the restraining winding RW of the differential relay 23 through conductors W1 and W3 and an auxiliary switch CB3 which is open when the circuit breaker CB is closed and which is closed when the circuit breaker is open. The resistor R15 may be adjusted to provide the desired closing voltage.

Figure 7:
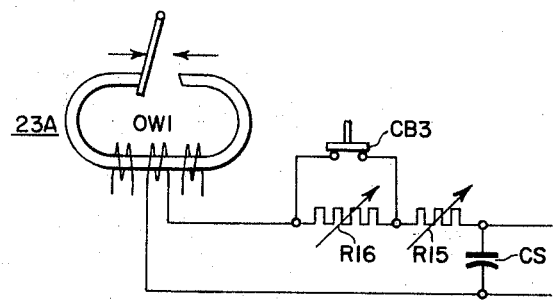
FIG. 7 is a schematic view showing a modification of the circuits of FIG. 2.

An alternate connection for the resistor R15 is shown in FIG. 7. In FIG. 7 the differential relay 23A is similar to the relay 23 of FIG. 2 except for the addition of a second operating winding OW1. This winding is connected for energization across a source of constant direct voltage represented by the capacitor C5 in series with the adjustable resistor R15 and an adjustable resistor R16. The auxiliary switch CB3 now shunts the resistor R16.

When the circuit breaker CB is open the auxiliary switch CB3 shunts the resistor R16 and the resistor R15 alone controls the energization of the second operating winding OW1. Thus the resistor R15 may be adjusted to provide the operating characteristic represented by the curve CU4 in FIG. 6.

When the circuit breaker CB is closed the auxiliary switch CB3 is open to place the second operating winding OW1 under the control of both of the resistors R15 and R16. Thus the resistor R16 may be adjusted to adjust the tripping characteristic without affecting the closing characteristic of the circuit breaker control.

Inasmuch as the armature 73 of the differential relay 23 is biased into its closing condition it follows that if the feeder circuit is energized and the network 1 is dead the circuit breaker CB will close to connect the feeder circuit to the dead network.

If the network, when energized, is connected to the load terminals of the circuit breaker with two phase conductors accidentally interchanged, substantially no output is derived from the filter 9. In order to prevent the undesirable closure of the circuit breaker under these circumstances, the circuit breaker is restrained from closing by the output of the filter 13.

The secondary winding NS of the transformer TR3 is connected across a load resistor 95, and through a rectifier 101 across a resistor 96 and across a filter capacitor C8. The voltage across the resistor 96 is applied across the operating winding OW of the polar relay 29 to develop thereacross a voltage proportional to the negative symmetrical component of the polyphase voltage present at the load terminals of the circuit breaker CB through a threshold device 99 and a rectifier 104. By virtue of the rectifiers 101 and 104 the operating winding of the relay 29 is energized with direct current in accordance with the negative symmetrical component of the polyphase voltage appearing at the load terminals of the circuit breaker CB. The threshold device 99 blocks the flow of current until the voltage across the threshold device exceeds a predetermined value. This prevents any negative symmetrical component resulting from load unbalance from affecting the magnetic amplifier. The threshold device 99 may take the form of a Zener diode. When current flows through the Zener diode 99 it is in such direction that the energization of the operating winding OW of the differential relay 29 exceeds the energization of the restraining winding RW of this relay. Consequently, the armature of the differential relay 29 is operated to the right as viewed in FIG. 2 to prevent closure of the circuit breaker.

In a similar manner the filter 10 applies a direct voltage across the resistor 96 through the transformer TR3A and a rectifier 102. This direct voltage energizes the operating winding OW of the relay 29 through the rectifier 104 and the threshold device 99 in accordance with any negative symmetrical component appearing on the feeder circuit side of the circuit breaker above the magnitude determined by the threshold device. A load resistor 97 is connected across the secondary winding of the transformer TR3A. This may be an ordinary resistor similar to the resistor 95. Preferably it is a varistor which has a resistance which decreases with an increase in voltage thereacross. This is desirable for the reason that the varistor protects the associated circuits from high voltages which would otherwise be present for certain feeder connections.

The operation of the system shown in FIG. 2 now will be reviewed briefly. Let it be assumed first that the circuit breaker CB is open and that the feeder circuit 3 and the network 1 are both deenergized. The differential relays 23 and 29 are in the conditions shown in FIG. 2 and a closing circuit is established for the closing coil of the circuit breaker CB. However, no voltage is present to energize this closing circuit.

If the feeder circuit 3 is now energized, voltage is available for energizing the closing circuit of the circuit breaker CB and the circuit breaker CB closes to connect the energized feeder circuit to the network.

Let it be assumed next that the circuit breaker CB is open and that the feeder circuit and the network are both energized. If the network has been connected accidentally to the load terminals of the circuit breaker with two of the phases interchanged, the filter 13 in effect sees a substantial negative symmetrical component of polyphase voltage and the substantial voltage appears across the transformer TR3. This voltage is sufficient to break over the Zener diode 99 and a substantial current flows through the operating winding OW of the differential relay 29. The current through the winding suffices to move the armature of the differential relay 29 away from the position illustrated in FIG. 2 to open the closing circuit of the circuit breaker. Consequently, the circuit breaker remains open.

Similarly, if the feeder circuit has been connected accidentally to the transformer 5 with two of the phases interchanged, the filter 10 produces a substantial voltage across the transformer TR3A. This voltage suffices to break over the Zener diode 99 and to direct substantial current through the operating winding OW of the differential relay 29. The resulting operation of the relay opens the closing circuit of the circuit breaker.

Let it be assumed that the feeder circuit and the network are both properly connected to the circuit breaker. The discriminator 25 now compares voltages corresponding to the phasing voltage appearing across the A-pole of the circuit breaker CB and the reference voltage which is the load voltage to ground for phase A. If the phase relationships are such that the circuit breaker should not be closed, a negative voltage appears across the capacitor C1. This negative voltage energizes the control windings of the magnetic amplifier 27 to operate the armature of the differential relay 29 away from the position illustrated in FIG. 2. This opens the closing circuit of the circuit breaker and prevents closure thereof.

However, if the phase relationships indicate that the circuit breaker may close, a positive voltage appears across the capacitor C1. This positive voltage energizes the control windings of the magnetic amplifier 27 to maintain the armature of the differential relay 29 in the position illustrated in FIG. 2. This is the circuit-breaker-closing position of the differential relay 29.

At the same time, the discriminator 19 compares a voltage corresponding to the phase-shifted voltage appearing across the C phase supply and load contacts of the circuit breaker with the positive symmetrical component of the polyphase voltage at the load terminals of the circuit breaker. If the phase relations are correct for circuit-breaker closure, a negative voltage appears across the capacitor C3. This negative voltage energizes the control windings of the magnetic amplifier 21 to urge the armature of the differential relay 23 against the fixed contacts 75. The two differential relays thus complete a closing circuit for the circuit CB and the circuit breaker consequently closes.

Had the phase relations measured by the discriminator 19 been incorrect for circuit breaker closure, a positive voltage would have appeared across the capacitor C3. This positive voltage would have energized the control windings of the magnetic amplifier 21 in such direction that the differential relay 23 would operate its armature 73 away from the fixed contact 75 to open the closing circuit of the circuit breaker CB.

With the circuit breaker CB in its closed condition, the discriminator 19 compares the phase of the positive symmetrical component of the polyphase current supplied through the circuit breaker CB with the positive symmetrical component of the polyphase voltage at the load terminals of the circuit breaker. As long as the direction of power is from the feeder circuit to the network a negative voltage appears across the capacitor C3. This negative voltage operates through the magnetic amplifier 21 to maintain the armature 73 of the differential relay 23 against the fixed contact 75 to prevent tripping of the circuit breaker.

If the direction of power flow through the circuit breaker is from the network to the feeder circuit the discriminator 19 supplies a positive voltage across the capacitor C3. This positive voltage operates through the magnetic amplifier 21 to move the armature 73 of the differential relay 23 into engagement with the tripping contact 77 to complete a tripping circuit for the circuit breaker.

It should be noted that the two input circuits and the two output circuits provided for the discriminator 25 are similar or balanced. This means that variations in temperature of the discriminator cannot unbalance the circuits to produce false output signals. Furthermore, the input circuits of the magnetic amplifier are in series and the output circuits are balanced. These circuits and the magnetic amplifier as a whole do not introduce incorrect operation as a result of temperature variations. Inasmuch as equipment of this type is employed under conditions wherein temperatures can change appreciably, the inherent freedom of the equipment from effects due to temperature is desirable.

Furthermore, the phasing voltage is applied directly to the phase-shifting network 18. If circuits are employed for indirectly generating the equivalent of a phasing voltage, possibilities exist for generation of a spurious phasing voltage by such circuits.

Figure 3:
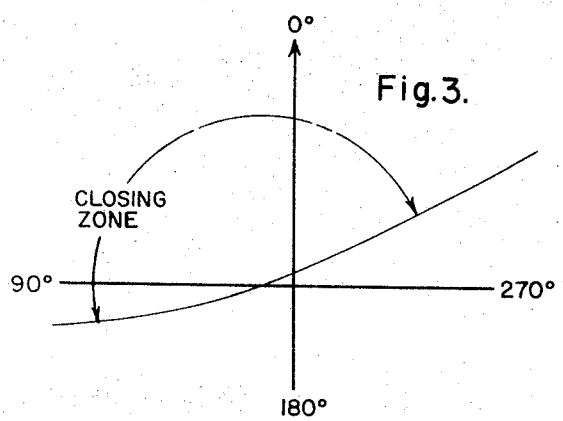
FIGS. 3, 4, 5 and 6 are graphical representations useful in explaining the invention.

In a prior art static closing control having unbalanced circuits, a curved closing characteristic similar to that shown in FIG. 3 was provided. FIG. 3 is a polar representation wherein angular designations correspond to phase displacements between the load and phasing voltages employed (conventional counterclockwise rotation of vectors is assumed) and radial distances represent magnitudes of the phasing voltages. The phase-A-to-ground voltage is assumed to fall along the 0° line of FIG. 3. A phasing voltage across the A pole of the circuit breaker which falls outside the closing zone of FIG. 3 prevents circuit breaker closure.

FIG. 4 represents a similar representation for curves CU1 and CU2 which represent the performance of the discriminator 25 of FIG. 2. Inspection shows that the performance curves of FIG. 4 are much straighter than the curve of FIG. 3, and represent a distinct improvement in performance.

A further improvement resides in the provision of separate adjustments for phase angle and magnitude of phasing voltage represented by the curves of FIG. 4. By adjustment of the resistor R7 in the phase-shifting network 18, the "torque angle" or the slope of the curves CU1 and CU2 through the origin of the graph can be adjusted. By adjustment of the resistor 49 in the magnetic amplifier 27, the offset of the operating curve can be adjusted. Thus, in FIG. 4, the operating curve CU1 may be shifted to the position represented by the curve CU2 through adjustment of the resistor 49.

Although the invention has been described with reference to certain specific embodiments thereof, numerous modifications falling within the spirit and scope of the invention are possible.

I claim as my invention:

1. In a network protector for controlling the connection and disconnection of a polyphase alternating current supply circuit and a polyphase alternating current load circuit, a circuit breaker having supply terminals for connection to the supply circuit and load terminals for connection to the load circuit, circuit-breaker-closing-control means effective when the circuit breaker is open in response to electrical conditions at said terminals for closing the circuit breaker provided that the electrical conditions at said terminals are such that the supply terminals can supply electric energy through the circuit breaker to the load terminals, and restraining means responsive to the presence of a negative symmetrical component at the supply terminals for restraining closure of the circuit breaker.

2. In a network protector for controlling the connection and disconnection of a polyphase alternating current supply circuit and a polyphase alternating current load circuit, a circuit breaker having supply terminals for connection to the supply circuit and load terminals for connection to the load circuit, circuit-breaker-closing-control means effective when the circuit breaker is open in response to electrical conditions at said terminals for closing the circuit breaker provided that the electrical conditions at said terminals are such that the supply terminals can supply electric energy through the circuit breaker to the load terminals, and restraining means responsive to the presence of a negative symmetrical component at the supply terminals only in excess of a substantial predetermined threshold value for restraining closure of the circuit breaker, said restraining means being responsive to presence of a substantial negative symmetrical component at the load terminals for restraining closure of the circuit breaker.

3. In a network protector for controlling the connection and disconnection of a polyphase alternating current supply circuit and a polyphase alternating current load circuit, a circuit breaker having supply terminals for connection to the supply circuit and load terminals for connection to the load circuit, circuit-breaker-closing-control means comprising a saturable reactor unit having output winding means and control winding means, means for applying a first bias to the control winding means dependent on the difference between a first entity dependent on the sum of a quantity dependent on the voltage across a pole of one phase of said circuit breaker and a quantity representative of a voltage-to-ground for said phase of the load terminals, and a second entity dependent on the difference of said quantities, means for applying a second bias to the control winding means acting in opposition to the first bias and dependent on the negative symmetrical component of the polyphase voltage at the supply terminals, said closing control means being effective for closing the circuit breaker only if the first bias represents a condition wherein the power can flow from the supply terminals to the load terminals and if the negative symmetrical component is below a predetermined value.

4. In a device for controlling the connection and disconnection of a first polyphase alternating current circuit and a second polyphase alternating current circuit, a polyphase circuit breaker having first terminals for connection to the first circuit and second terminals for connection to the second circuit, means for deriving from said terminals when the circuit breaker is open first and second direct quantities respectively dependent on the sum and difference of an entity dependent on the voltage across the pole of one phase of the circuit breaker and an entity representative of the voltage-to-ground of such phase of the second circuit, and closing means responsive to the difference between said direct quantities for tripping said circuit breaker, said closing means comprising a polarity-sensitive saturable reactor having first and second saturable reactor sections provided respectively with first and second control winding means and with first and second output winding means, coupling means connecting the first and second control winding means for energization in dependence on the difference between said direct quantities, biasing means for biasing the first and second saturable reactor sections for response respectively to positive and negative values of said difference, and differential relay means differentially responsive to the outputs of the first and second output winding means, and means dependent on the condition of the differential relay means for closing the circuit breaker.

5. In a device for controlling the connection and disconnection of a first polyphase alternating current circuit and a second polyphase alternating current circuit, a polyphase circuit breaker having first terminals for connection to the first circuit and second terminals for connection to the second circuit, means for deriving from said terminals when the circuit breaker is open first and second direct quantities respectively dependent on the sum and difference of an entity dependent on the voltage across the pole of one phase of the circuit breaker and an entity representative of the voltage-to-ground of such phase of the second circuit, and closing means responsive to the difference between said direct quantities for tripping said circuit breaker, said closing means comprising a polarity-sensitive saturable reactor having first and second saturable reactor sections provided respectively with first and second control winding means and with first and second output winding means, coupling means connecting the first and second control winding means for energization in dependence on the difference between said direct quantities, biasing means for biasing the first and second saturable reactor sections for response respectively to positive and negative values of said difference, and differential relay means differentially responsive to the outputs of the first and second output winding means, and means dependent on the condition of the differential relay means for closing the circuit breaker, and means for adjusting the value of the difference in the outputs of the first and second output winding means to which the differential relay means responds.

6. In a network protection arrangement for an electrical system including an alternating current supply circuit and an alternating current load circuit, a circuit breaker having supply terminals for connection to the supply circuit and load terminals for connection to the load circuit, and control means responsive to first predetermined conditions present at said terminals when the circuit breaker is closed for tripping said circuit breaker, said control means being responsive to second predetermined conditions present at said terminals when the circuit breaker is open for closing said circuit breaker, said control means including first adjustable impedance means adjustable for altering the first predetermined conditions to which the control means responds and second adjustable impedance means adjustable for altering the second predetermined conditions to which the control means responds, and means responsive to operation of the circuit breaker from one to the other of its tripped and closed conditions for rendering one of said impedance means ineffective for altering said predetermined conditions.

7. An arrangement as recited in claim 6 wherein said control means comprises a saturable reactor device energized from said terminals to produce a circuit-breaker-trip-controlling output when said circuit breaker is closed and said first predetermined conditions are present, said saturable reactor device producing a circuit-breaker-closure-controlling output when said circuit breaker is open and said second predetermined conditions are present, said first adjustable impedance means comprising an adjustable resistor operable for adjusting the relationship between the first-named output and the first predetermined conditions, and said second adjustable impedance comprising an adjustable resistor operable for adjusting the relationship between the second-named output and the second predetermined conditions.

References Cited by the Examiner
UNITED STATES PATENTS

| | | | |
|---|---|---|---|
| 2,900,528 | 8/1959 | Baude | 307—87 |
| 3,248,609 | 4/1966 | Gambale | 317—23 |

MILTON O. HIRSHFIELD, *Primary Examiner.*

J. D. TRAMMELL, *Assistant Examiner.*